United States Patent
Nguyen et al.

(10) Patent No.: US 11,230,660 B2
(45) Date of Patent: Jan. 25, 2022

(54) LIGHTWEIGHT MICRO-PROPPANT

(71) Applicant: Halliburton Energy Services, Inc., Houston, TX (US)

(72) Inventors: Philip D. Nguyen, Houston, TX (US); Mallikarjuna Shroff Rama, Pune (IN); Prashant D. Chopade, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/304,096

(22) PCT Filed: Jul. 8, 2016

(86) PCT No.: PCT/US2016/041505
§ 371 (c)(1),
(2) Date: Nov. 21, 2018

(87) PCT Pub. No.: WO2018/009214
PCT Pub. Date: Jan. 11, 2018

(65) Prior Publication Data
US 2020/0056090 A1 Feb. 20, 2020

(51) Int. Cl.
*E21B 43/267* (2006.01)
*C09K 8/80* (2006.01)
(Continued)

(52) U.S. Cl.
CPC .............. *C09K 8/80* (2013.01); *C08F 212/08* (2013.01); *C08F 212/12* (2013.01);
(Continued)

(58) Field of Classification Search
None
See application file for complete search history.

(56) References Cited

U.S. PATENT DOCUMENTS

| | | | |
|---|---|---|---|
| 3,785,438 A | * | 1/1974 | Jackson ................. C09K 8/508 166/295 |
| 4,493,875 A | | 1/1985 | Beck et al. |

(Continued)

FOREIGN PATENT DOCUMENTS

| | | |
|---|---|---|
| CA | 2817871 | 5/2012 |
| CA | 3009048 | 3/2015 |

(Continued)

OTHER PUBLICATIONS

Canadian Examination Report dated Dec. 10, 2019, Canadian Patent Application No. 3,026,768.

(Continued)

*Primary Examiner* — Angela M DiTrani Leff
(74) *Attorney, Agent, or Firm* — McGuireWoods LLP

(57) ABSTRACT

Lightweight micro-proppant suitable to prop open not only near-wellbore microfractures but also far-field microfractures. Some methods of fracturing and propping may comprise first introducing a pad fluid comprising a lightweight micro-proppant into a wellbore penetrating a subterranean formation at a rate and pressure sufficient to create or extend a fracture network in the subterranean formation, wherein the fracture network comprises microfractures. The lightweight micro-proppant comprises a thermoset nanocomposite having a specific gravity of about 0.9 to about 1.4 and having an average diameter of about 0.1 microns to about 50 microns. Then introducing a proppant slurry comprising a macro-proppant into the wellbore penetrating the subterranean formation after introducing the pad fluid forming a proppant pack in the fracture network wherein at least some of the lightweight micro-proppant is located in the microfractures.

11 Claims, 1 Drawing Sheet

(51) Int. Cl.
  *C08F 212/08* (2006.01)
  *C08F 212/12* (2006.01)
  *C08F 236/10* (2006.01)
  *C09K 8/68* (2006.01)

(52) U.S. Cl.
  CPC .............. *C08F 236/10* (2013.01); *C09K 8/68* (2013.01); *E21B 43/267* (2013.01); *C09K 2208/10* (2013.01)

(56) References Cited

U.S. PATENT DOCUMENTS

| | | |
|---|---|---|
| 6,248,838 B1 | 6/2001 | Albright |
| 6,451,953 B1 | 9/2002 | Albright |
| 6,860,328 B2 | 3/2005 | Gonzalez et al. |
| 7,210,528 B1* | 5/2007 | Brannon ................. C09K 8/62 507/140 |
| 7,255,168 B2 | 8/2007 | Nguyen et al. |
| 7,459,209 B2 | 12/2008 | Smith et al. |
| 7,494,711 B2 | 2/2009 | Kaufman et al. |
| 7,803,740 B2 | 9/2010 | Bicerano et al. |
| 7,803,741 B2 | 9/2010 | Bicerano et al. |
| 7,803,742 B2 | 9/2010 | Bicerano et al. |
| 7,845,409 B2 | 12/2010 | Shinbach et al. |
| 7,902,125 B2 | 3/2011 | Bicerano et al. |
| 8,006,754 B2 | 8/2011 | Bicerano |
| 8,006,755 B2 | 8/2011 | Bicerano |
| 8,088,718 B2 | 1/2012 | Bicerano et al. |
| 8,258,083 B2 | 9/2012 | Bicerano |
| 8,278,373 B2 | 10/2012 | Bicerano et al. |
| 8,361,934 B2 | 1/2013 | Bicerano |
| 8,455,403 B2 | 6/2013 | Bicerano et al. |
| 8,461,087 B2 | 6/2013 | Bicerano |
| 8,466,093 B2 | 6/2013 | Bicerano et al. |
| 8,492,316 B2 | 6/2013 | Bicerano |
| 9,006,314 B2 | 4/2015 | Bicerano |
| 9,034,799 B2 | 5/2015 | Bicerano |
| 2009/0029878 A1* | 1/2009 | Bicerano ................. C09K 8/035 507/107 |
| 2011/0311719 A1 | 12/2011 | Bicerano |
| 2011/0312859 A1 | 12/2011 | Bicerano |
| 2012/0325473 A1* | 12/2012 | Bicerano ................. B01J 31/165 166/280.2 |
| 2013/0096037 A1* | 4/2013 | Bicerano ................. C09K 8/035 507/216 |
| 2013/0123152 A1 | 5/2013 | Stephens et al. |
| 2013/0244912 A1 | 9/2013 | Hughes et al. |
| 2013/0284437 A1* | 10/2013 | Nguyen ................. E21B 43/267 166/280.1 |
| 2014/0034309 A1 | 2/2014 | Saini et al. |
| 2014/0224493 A1 | 8/2014 | Soliman et al. |
| 2015/0151452 A1 | 6/2015 | Estur et al. |
| 2017/0181302 A1* | 6/2017 | Yang .................... H05K 5/0286 |

FOREIGN PATENT DOCUMENTS

| | | |
|---|---|---|
| WO | 2011115800 | 9/2011 |
| WO | 2015102628 A1 | 7/2015 |

OTHER PUBLICATIONS

M. T. Gokmen et al. (2012). Porous polymer particles—A comprehensive guide to synthesis, characterization, functionalization and applications Progress in Polymer Science 37 ( ), 365-405. Doi 10.1016/j.progpolymsci.2011.07.006; http://www.sciencedirect.com/science/article/pii/S0079670011000992.

H. Hu et al. "Preparation and properties of graphene nanosheets-polystrene nanocomposites via in situ emulsion polymerization," Chemical Physics Letters 484 (2010) 247-253, http://www.elsevier.com/locate/cplett, (c) 2009 Elsevier B.V.

Dazhen Wu, et al. "Novel One-Step Route for Synthesizing CdS/Polystyrene Nanocomposite Hollow Spheres," Langmuir 2004, 20, 5192-5195, © 2004 American Chemical Society Published on Web May 26, 2004.

Sheng-Wen Zhang, et al. "Synthesis of SiO2/Polystyrene Nanocomposite Particles via Miniemulsion Polymerization," Langmuir 2005, 21, 2124-2128, © 2005 American Chemical Society Published on Web Feb. 5, 2005.

J. Dahl, et al "Application of Micro Proppant in Liquids-Rich, Unconventional Reservoirs to Improve Well Production: Laboratory Results, Field Results, and Numerical Simulations," Abu Dhabi International Petroleum Exhibition and Conference, Abu Dhabi, UAE, Nov. 9-12, 2015, SPE-177663-MS, © 2015 Society of Petroleum Engineers.

International Search Report and Written Opinion dated Apr. 7, 2017; International PCT Application No. PCT/US2016/041505.

* cited by examiner

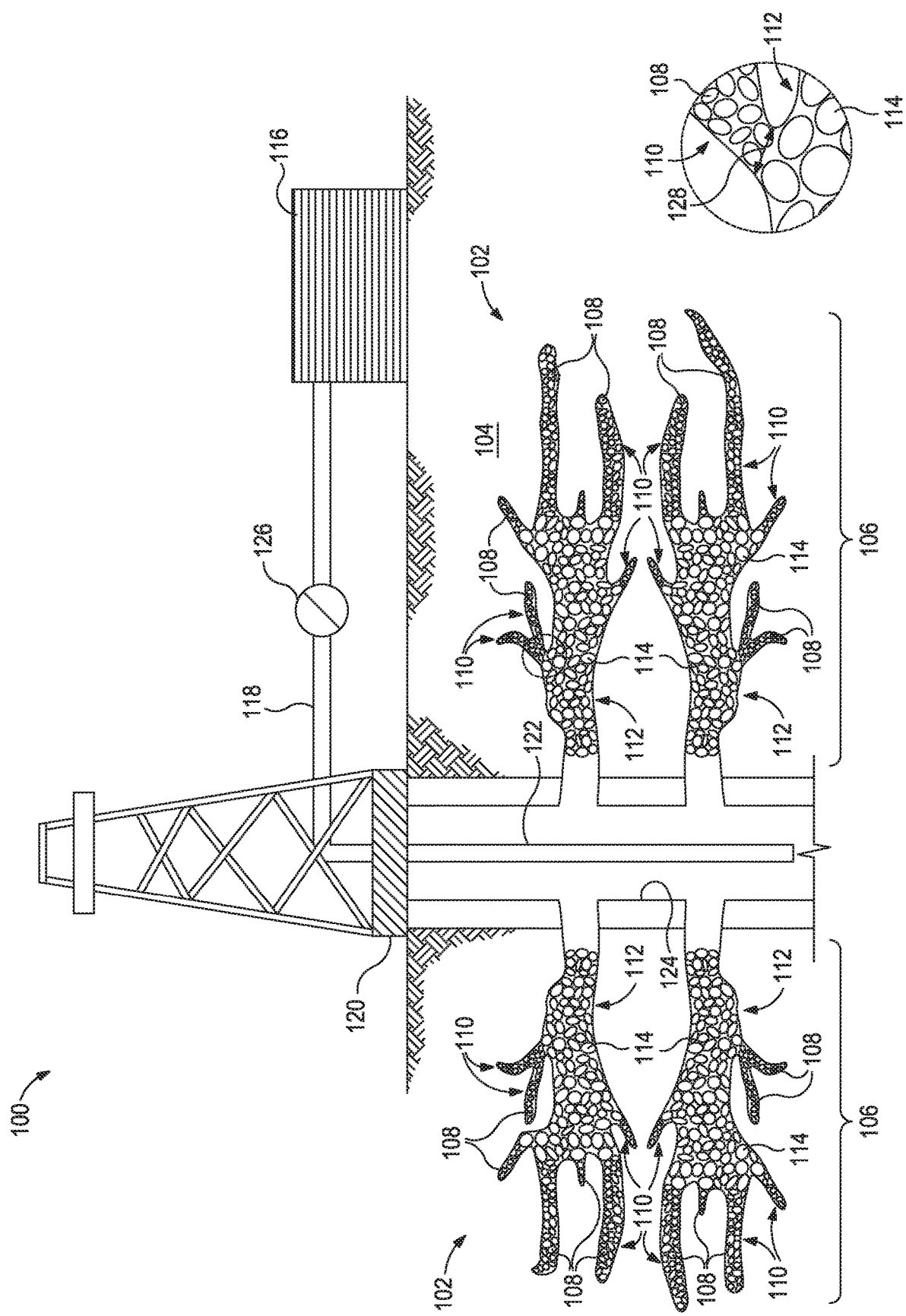

LIGHTWEIGHT MICRO-PROPPANT

BACKGROUND

The present disclosure relates to proppants and associated methods of fracturing subterranean formations.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The term "treatment fluid," as used herein, refers generally to any fluid that may be used in a subterranean application in conjunction with a desired function and/or for a desired purpose. The term "treatment fluid" does not imply any particular action by the fluid or any particular component thereof. By way of non-limiting example, a "treatment fluid" may be an acidizing fluid, a fracture-initiating fluid, a proppant-laden fluid, etc. As used herein, the term "fracture gradient" refers to a pressure necessary to create or enhance at least one fracture in a particular subterranean formation location, increasing pressure within a formation may be achieved by placing fluid therein at a high flow rate to increase the pressure on the formation. Placing a fluid at a rate or pressure that is below the threshold to create or enhance at least one fracture is known as placing the fluid into the formation at "matrix flow rate."

To achieve pressures above the fracture gradient, the treatment fluid is generally introduced at high pressures and/or high flow rates, which can cause turbulent flow of the treatment fluid. Such turbulent flow can result in friction pressure between the treatment fluid and subterranean formation equipment (e.g., wellbore piping, wellbore casing, and the like), as well as between the treatment fluid and the formation itself. Such friction pressure increases the energy necessary to pump the treatment fluid into the subterranean formation (e.g., the wellbore). Accordingly, friction reducing agents may be added to the treatment fluids to change the rheological properties of the treatment fluid to overcome or minimize the friction pressure.

Additionally, during stimulation operations, particulate solids are typically suspended in a portion of the treatment fluid and then deposited into the fractures, also increasing friction pressures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture." Proppant packs may be a collection of proppant particles that partially to fully pack a fracture network or individual fractures thereof. The collection of proppant particles may comprise clusters, aggregates, layers, and the like of the proppant particles.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system that can be used to form a proppant pack in a fracture network of a subterranean formation.

DETAILED DESCRIPTION

The present disclosure relates to proppants and associated methods of fracturing subterranean formations. More specifically, embodiments described herein relate to lightweight micro-proppant, which may be used to prop open not only near-wellbore microfractures but also far-field microfractures. Without being limited by theory, it is believed that lightweight micro-proppant may more readily traverse a fracture network and be placed in microfractures further from the wellbore as compared to a heavy micro-proppant that are prone to premature settling.

As used herein, the term "proppant" refers to particulates suitable for maintaining fractures open. As used herein, the term "lightweight micro-proppant" refers to particles having a specific gravity of about 0.9 to about 1.4 and an average diameter of about 0.1 microns to about 80 microns. As used herein, the term "heavy micro-proppant" refers to particles having a specific gravity of greater than about 1.5 and an average diameter of about 0.1 microns to about 80 microns. As used herein, the term "macro-proppant" refers to particulates having an average diameter of about 100 microns or greater regardless of specific gravity. As used herein, the term "average diameter" refers to a number average diameter. For particles having an aspect ratio of 5 or less, diameter refers to the largest cross-sectional distance. For particles having an aspect ratio greater than 5, diameter refers to the shortest cross-sectional distance that is perpendicular to the largest cross-sectional distance.

It should be understood that the terms "particulate" and "particle," as used in this disclosure, includes all known shapes of materials, including substantially spherical materials, fibrous materials, polygonal materials (such as cubic materials), and combinations thereof.

As used herein, the term "microfracture" refers to fractures (e.g., natural fractures, induced secondary, and tertiary fractures) with an opening that is 100 microns or less in the smallest cross-sectional dimension. As used herein, the opening of a microfracture refers to the location in which the microfracture intersects and branches from a primary fracture.

As used herein, the term "far-field" refers to being 5 feet or greater from the wellbore, and "near wellbore" refers to formation region within 5 ft of the wellbore.

FIG. 1 shows an illustrative schematic of a system 100 that can be used to form a proppant pack 106 in a fracture network 102 of a subterranean formation 104, according to one or more embodiments of the present disclosure. The illustrated proppant pack 106 comprises lightweight micro-proppant 108 in the microfractures 110 of the fracture network 102 and macro-proppant 114 in the primary fractures 112. FIG. 1 includes an enlarged view of a microfracture 110 intersecting a fracture 112 to illustrate the opening 128, which is 100 microns or less in the smallest cross-sectional dimension.

In an alternative embodiment, a proppant pack 106 may comprise lightweight micro-proppant in the microfractures 110 and a mixture of lightweight micro-proppant and macro-proppant in the primary fractures 112. In some embodiments, a proppant pack 106 may comprise heavy micro-proppant in the microfractures 110, the primary fractures 112, or a combination thereof. In some embodiments, a proppant pack 106 may comprise proppant of intermediate sizes (e.g., ranging between about 50 microns and about 100 microns) (which may be lightweight or heavy) in the microfractures 110, the primary fractures 112, or a combination thereof. When proppant of intermediate sizes are included in microfracture 110, the concentration relative to the lightweight micro-proppant should be low (e.g., about 1:10 to about 1:100 intermediately-sized proppant to lightweight micro-proppant).

It should be noted that while FIG. 1 generally depicts a land-based system, it is to be recognized that like systems may be operated in subsea locations as well. As depicted in FIG. 1, system 100 may include one or more mixing tanks 116, in which the fluids that carry proppant (lightweight micro-proppant 108 and/or macro-proppant 114) downhole may be prepared. In other embodiments, however, such fluids may be formulated offsite and transported to a worksite.

The fluids carrying proppant may be conveyed via line 118 to wellhead 120 and enter a tubular 122 extending from wellhead 120 into subterranean formation 104. Upon being ejected from tubular 122, the fluids carrying proppant may subsequently penetrate into the fracture network 102 in the subterranean formation 104 to form the proppant pack 106. In some instances, tubular 122 may have a plurality of orifices (not shown) through which the fluids carrying proppant may enter the wellbore 124 proximal to a portion of the subterranean formation 104 to be fractured/propped. In some instances, the wellbore 124 may further comprise equipment or tools (not shown) for zonal isolation of a portion of the subterranean formation 104 to be treated.

Pump 126 may be configured to raise the pressure of the fluids carrying proppant to a desired degree before introduction into tubular 122, whether the fluids are provided from the mixing tanks 116 or other vessel (e.g., a truck, a railcar, a barge, or the like). It is to be recognized that system 100 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. Further, FIG. 1 may be modified with suitable valves (before or after the pump 126) to appropriately convey the fluids carrying proppant.

The pump 126 may be a high pressure pump in some embodiments. As used herein, the term "high pressure pump" will refer to a pump that is capable of delivering a fluid downhole at a pressure of 1000 psi or greater. A high pressure pump may be used when it is desired to introduce the fluids carrying proppant to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump 126 may be a low pressure pump. As used herein, the term "low pressure pump" will refer to a pump that operates at a pressure of less than 1000 psi. In some embodiments, a low pressure pump may be fluidly coupled to a high pressure pump that is fluidly coupled to the tubular. That is, in such embodiments, the low pressure pump may be configured to convey the fluids carrying proppant to the high pressure pump. In such embodiments, the low pressure pump may "step up" the pressure of the fluids carrying proppant before it reaches the high pressure pump.

It is recognized that the disclosed lightweight micro-proppant may directly or indirectly affect the various downhole equipment and tools that may come into contact with the lightweight micro-proppant during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

As used herein, the term "pad fluid" refers to a fluid introduced into the formation at a rate and pressure sufficient to create or extend a fracture network 102 in the subterranean formation 104 (e.g., at or above a fracture gradient of the subterranean formation 104). As used herein, the term "proppant slurry" refers to a fluid comprising proppant that is introduced after the pad fluid. Generally, the proppant slurry is introduced at rate and pressure sufficient to maintain the fracture network 102 being open. Then, the rate and pressure of the fluid may be reduced and the proppant placed in the fracture network 102 maintains portions of the fracture network 102 being open, which may still be at or above a fracture gradient of the subterranean formation 104.

In some instances, a method of placing proppant into a subterranean formation to produce a proppant pack 106 may use (A) a pad fluid comprising a base fluid and lightweight micro-proppant 108 and optionally heavy micro-proppant and (B) a proppant slurry comprising a base fluid and macro-proppant 114 and optionally lightweight micro-proppant 108, heavy micro-proppant, or both. In such a method, the lightweight micro-proppant 108 may advantageously be placed in the microfractures 110 as they form.

In some instances, a method of placing proppant into a subterranean formation to produce a proppant pack 106 may use (A) a pad fluid comprising no proppant and (B) a proppant slurry comprising a base fluid, macro-proppant 114, and lightweight micro-proppant 108 and optionally heavy micro-proppant. Without being limited by theory, it is believed that the reduced density of the lightweight micro-proppant 108 may allow the lightweight micro-proppant 108 to traverse the fracture network 102 more readily than the macro-proppant 114 and the heavy micro-proppant and be preferentially placed in the microfractures 110 further from the wellbore, which may increase the productivity of the well in hydrocarbon production operations. Optionally, in some instances, the size of the macro-proppant 114, the lightweight micro-proppant 108, and the heavy micro-proppant may be selected so that the lightweight micro-proppant 108 and the heavy micro-proppant may flow through the interstitial spaces between the macro-proppant 114 to further facilitate placement of the lightweight micro-proppant 108 in the microfractures 110.

In some instances, a method of placing proppant into a subterranean formation to produce a proppant pack 106 may use (A) a pad fluid comprising no proppant, (B) a first proppant slurry comprising a base fluid and lightweight micro-proppant 108, and (C) a second proppant slurry comprising a base fluid and macro-proppant 114 and optionally lightweight micro-proppant 108, heavy micro-proppant, or both.

While in the foregoing examples, the fluids may be introduced into the wellbore sequentially, there may be spacer fluids between each of the different fluids. For example, in the first example, a spacer fluid with no proppant may be included between the pad fluid comprising a base fluid and lightweight micro-proppant 108 and the proppant slurry comprising a base fluid and macro-proppant 114 and optionally lightweight micro-proppant 108.

In some embodiments, the lightweight micro-proppant 108 and/or the heavy micro-proppant may be present in a pad fluid in an amount of about 0.001 pounds per gallon ("ppg") to about 1 ppg, including a subset range thereof like about 0.001 ppg to about 0.01 ppg, about 0.01 ppg to about 0.1 ppg, and about 0.1 ppg to about 1 ppg. In some embodiments, the lightweight micro-proppant 108 and/or the heavy micro-proppant may be present in a proppant slurry in an amount of about 0.001 ppg to about 5 ppg, including a subset range thereof like about 0.001 ppg to about 0.05 ppg, about 0.05 ppg to about 0.5 ppg, and about 0.5 ppg to about 5 ppg. In some embodiments, the macro-proppant 114 may be present in a proppant slurry in an amount of about 0.01 ppg to about 20 ppg, including a subset range thereof like about 0.01 ppg to about 1 ppg, about 0.1 ppg to about 5 ppg, and about 5 ppg to about 20 ppg.

Lightweight micro-proppant 108 and/or the heavy micro-proppant may have an average diameter of about 0.1 microns to about 80 microns. In some instances, a subset of the foregoing average diameter range may be preferred. Exemplary average diameter ranges may include, but are not limited to, about 0.1 microns to about 1 micron, about 0.1 microns to about 10 microns, about 0.1 microns to about 25 microns, about 5 microns to about 25 microns, about 5 microns to about 50 microns, about 5 microns to about 25 microns, and about 25 microns to about 80 microns.

Particulates suitable for use as lightweight micro-proppant 108 may comprise thermoset nanocomposites (i.e., nanoparticles embedded in a thermoset polymer), wherein the nanocomposite has a specific gravity of about 0.9 to about 1.4. As used herein, the term "nanoparticle" refers to particles having average diameter less than about 500 nm. As will be recognized by one of skill in the art, the average diameter of the nanoparticles should be less than, and preferably several times less than, the average diameter of the lightweight micro-proppant 108. For example, when producing lightweight micro-proppant 108 with an average diameter of about 0.1 microns to about 0.5 microns, the nanoparticles may preferably have an average diameter of less than about 50 nm.

Exemplary nanoparticles suitable for reinforcing the thermoset polymers may include, but are not limited to, carbon black, fumed silica, flumed alumina, carbon nanofibers, carbon nanotubes, cellulosic nanofibers, natural nanoclays, synthetic nanoclays, fly ash, metal nanoparticles, metal alloy nanoparticles, metal oxide nanoparticles, and the like, and any combination thereof.

Nanoparticles may have an average diameter of about 1 nm to about 500 nm. In some instances, a subset of the foregoing average diameter range may be preferred. Exemplary average diameter ranges may include, but are not limited to, about 1 nm to about 10 nm, about 5 nm to about 25 nm, about 5 nm to about 50 nm, about 10 nm to about 100 nm, about 100 nm to about 500 nm, and about 250 nm to about 500 nm.

Nanoparticles may be present in the lightweight micro-proppant 108 in an amount of about 0.1% to about 60% by weight of the lightweight micro-proppant 108, including subset ranges thereof like about 0.1% to about 10%, about 1% to about 25%, or about 25% to about 60%.

Exemplary thermoset polymers may include, but are not limited to, styrene-ethylvinylbenzene-divinylbenzene terpolymers (e.g., with about 3% to about 35% divinylbenzene by weight of the monomers).

In some instances, the thermoset nanocomposites may further comprise additives like impact modifiers (e.g., rubber particles). Without being limited by theory, an impact modifier may reduce the brittleness of a thermoset nanocomposite.

The lightweight micro-proppant 108 may be produced by any suitable method. Some production methods may, for example, use in situ polymerization (e.g., emulsion, dispersion, or suspension polymerizations) where the nanoparticles and additives (if used) may be included with the monomers of the thermoset polymer. Then, polymerization may be initiated to produce a thermoset nanocomposite. In some instances, such methods may produce larger particulates, which may be mechanically treated to reduce the desired particle size for the lightweight micro-proppant 108. Exemplary mechanical treatments may include grinding, ball milling, crushing, cutting, and the like.

For example, with the in situ emulsion polymerization, the monomers, nanoparticles, and additives (if used) may be in the discontinuous phase of an emulsion. The size of particulates formed may depend on, inter alia, (1) the ratio of volume of the discontinuous phase and the continuous phase and (2) the composition of the discontinuous and continuous phases, and (3) the concentration and composition of surfactant and/or polymer being used for emulsification. In some instances, the nanoparticle may stay within the emulsion particle by modifying the nanoparticle surface with vinyl functional groups so that the nanoparticle can tether to the growing polymer chains within the discontinuous phase.

In yet another example, the nanoparticles and additives (if used) may be added to a melt of the thermoset polymer. The melt may then be extruded or molded into particles, fibers, or another form and, if needed, subsequently treated to reduce the desired particle size for the lightweight micro-proppant 108.

In some instances, a post-polymerization step like heat-treatment and/or irradiation may optionally be implemented in combination with any of the foregoing methods of forming lightweight micro-proppant 108 to further advance the curing of the thermoset polymer.

In some instances, a porogen may be included in any of the foregoing methods of forming the thermoset nanocomposite (e.g., during in situ polymerization or in the polymer melt). As used herein, the term "porogen" refers to a substance that causes pores to be formed in the final thermoset nanocomposite. Without being limited by theory, it is believed that controlling the amount of pores in the thermoset nanocomposite may allow for controlling the specific gravity of the thermoset nanocomposite. Exemplary porogens may include, but are not limited to, toluene, heptane, and the like, and any combination thereof.

Particulates suitable for use as macro-proppant 114 and/or heavy micro-proppant may comprise materials that include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

Suitable base fluids for the pad fluid and proppant slurries may include, but not be limited to, oil-based fluids, aqueous-based fluids, aqueous-miscible fluids, water-in-oil emulsions, or oil-in-water emulsions. Exemplary oil-based fluids may include alkanes, olefins, aromatic organic compounds, cyclic alkanes, paraffins, diesel fluids, mineral oils, desulfurized hydrogenated kerosenes, and any combination thereof. Exemplary aqueous-based fluids may include fresh water, saltwater (e.g., water containing one or more salts dissolved therein), brine (e.g., saturated salt water), seawater, and any combination thereof. Exemplary aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Exemplary water-in-oil emulsions, also known as invert emulsions, may have an oil-to-water ratio of about 50:50 to about 99:1 by volume in the base fluid. It should be noted that for water-in-oil and oil-in-water emulsions, any mixture of the above may be used including the water being and/or comprising an aqueous-miscible fluid.

In some embodiments, a pad fluid, a proppant slurry, or both may optionally include additives like fibers, binding agents, and any combination thereof.

In some embodiments, the fibers, which may or may not be used to bear the pressure of a closed fracture, may be present the pad fluid, the proppant slurry, or both in an amount of about 0.01 ppg to about 20 ppg, including a subset range thereof like about 0.01 ppg to about 1 ppg, about 0.1 ppg to about 5 ppg, and about 5 ppg to about 20 ppg.

In some instances, to mitigate migration of the lightweight micro-proppant 108, the heavy micro-proppant, and/or the macro-proppant 114 within the fracture network, a binding agent may be used to consolidate the particulates. In some instances, the binding agent may be dissolved or otherwise suspended in present the pad fluid, the proppant slurry, or both. In some instances, the binding agent may be a coating on at least a portion of the lightweight micro-proppant 108, the heavy micro-proppant, and/or the macro-proppant 114. Exemplary binding agents may include, but are not limited to, non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, and silicon-based resins. Combinations and/or derivatives of these also may be suitable. It is within the ability of one skilled in the art, with the benefit of this disclosure, to determine the type and amount of consolidating agent to include in the methods of the embodiments of the present invention to achieve the desired results.

In some instances, to increase the permeability of the proppant pack 106 or portions thereof, the pad fluid, the proppant slurry, or both may optionally further comprise degradable particles. When degradable particles are included, methods may further involve at least partially degrading the degradable particles in the proppant pack 106. Exemplary degradable materials that the degradable particles may be formed of may include, but are not limited to, aliphatic polyesters, polylactic acid, polygylcolic acid, poly (s-caprolactone), poly(hydroxybutyrate), polyanhydrides, polysaccharides, chitins, chitosans, proteins, aliphatic polycarbonates, poly(amino acids), poly(ethylene oxides), polyphosphazenes, sodium borate, and the like, and any combination thereof.

Embodiments described herein include, but are not limited to, Embodiment A, Embodiment B, Embodiment C, Embodiment D, Embodiment E, and Embodiment F.

Embodiment A is a method that comprises: introducing a pad fluid comprising a lightweight micro-proppant into a wellbore penetrating a subterranean formation at a rate and pressure sufficient to create or extend a fracture network in the subterranean formation, wherein the fracture network comprises microfractures, and wherein the lightweight micro-proppant comprises a thermoset nanocomposite having a specific gravity of about 0.9 to about 1.4 and having an average diameter of about 0.1 microns to about 50 microns; introducing a proppant slurry comprising a macro-proppant into the wellbore penetrating the subterranean formation after introducing the pad fluid; forming a proppant pack in the fracture network wherein at least some of the lightweight micro-proppant is located in the microfractures.

Embodiment B is a system for performing the method of Embodiment A, the system comprising: a pump fluidly connected to a wellbore penetrating a subterranean formation that introduces the pad fluid and the proppant slurry into the wellbore.

Embodiments A and B may optionally further include one or more of the following: Element 1: wherein the pad fluid further comprises a heavy micro-proppant having a specific gravity of greater than about 1.5 and an average diameter of about 0.1 microns to about 80 microns; Element 2: wherein the pad fluid further comprises an intermediately-sized proppant at about 50 microns to about 100 microns and at a ratio to the lightweight micro-proppant of about 1:10 to about 1:100; Element 3: wherein the proppant slurry further comprises a heavy micro-proppant having a specific gravity of greater than about 1.5 and an average diameter of about 0.1 microns to about 80 microns; Element 4: slurry further comprises the intermediately-sized proppant having an average diameter of about 50 microns to about 100 microns; Element 5: wherein the lightweight micro-proppant is in the pad fluid in an amount of about 0.001 ppg to about 1 ppg;

Element 6: the method further comprising: repeating the steps of introducing the pad fluid and introducing the proppant slurry, thereby expanding the fracture network and the proppant pack therein; and Element 7: wherein the pad fluid is a first pad fluid and the method further comprises: introducing a second pad fluid into the wellbore at the rate and pressure sufficient to create or extend the fracture network in the subterranean formation. Exemplary combinations may include, but are not limited to, two or more of Elements 1-5 in combination and optionally in further combination with one or both of Elements 6 and 7; Element 6 and 7 in combination and optionally in further combination with one or more of Elements 1-5; and Element 6 or Element 7 in combination with one or more of Elements 1-5.

Embodiment C is a method that comprises: introducing a pad fluid into a wellbore penetrating a subterranean formation at a rate and pressure sufficient to create or extend a fracture network in the subterranean formation, wherein the fracture network comprises microfractures; introducing a proppant slurry comprising a macro-proppant and a lightweight micro-proppant into the wellbore penetrating the subterranean formation after introducing the pad fluid, wherein the lightweight micro-proppant comprises particles having a specific gravity of about 0.9 to about 1.4, having an average diameter of about 0.1 microns to about 50 microns, and comprising of a thermoset nanocomposite; forming a proppant pack in the fracture network wherein at least some of the lightweight micro-proppant is located in the microfractures.

Embodiment D is a system for performing the method of Embodiment A, the system comprising: a pump fluidly connected to a wellbore penetrating a subterranean formation that introduces the pad fluid and the proppant slurry into the wellbore.

Embodiments C and D may optionally further include one or more of the following: Element 8: wherein the pad fluid does not comprise proppant; Element 9: wherein the pad fluid comprises proppant (e.g., lightweight micro-proppant, heavy micro-proppant, intermediately-sized proppant, macro-proppant, or any combination thereof); Element 10: wherein the proppant slurry further comprises a heavy micro-proppant having a specific gravity of greater than about 1.5 and an average diameter of about 0.1 microns to about 80 microns; Element 11: wherein the proppant slurry further comprises intermediately-sized proppant having an average diameter of about 50 microns to about 100 microns; Element 12: Element 11 and wherein the intermediately-sized proppant is at a ratio to the lightweight micro-proppant of about 1:10 to about 1:100; and Element 13: wherein the lightweight micro-proppant is in the pad fluid in an amount of about 0.001 ppg to about 1 ppg. Exemplary combinations may include, but are not limited to, Element 8 in combination with one or more of Elements 10-12; Element 9 and optionally Element 13 in combination with one or more of Elements 10-12; and Elements 10-11 in combination and optionally in further combination with Element 13.

Embodiment E is a proppant slurry that comprises: a base fluid; and a lightweight micro-proppant comprising particles having a specific gravity of about 0.9 to about 1.4, having an average diameter of about 0.1 microns to about 50 microns, and comprising of a thermoset nanocomposite. Optionally, Embodiment E may further comprise one or more of the following: Element 14: wherein the proppant slurry does not comprise heavy micro-proppant having a specific gravity of greater than about 1.5 and an average diameter of about 0.1 microns to about 80 microns; Element 15: wherein the proppant slurry further comprises one selected from the group consisting of: heavy micro-proppant, intermediately-sized proppant, macro-proppant, and any combination thereof); Element 16: wherein the proppant slurry further comprises intermediately-sized proppant at about 50 microns to about 100 microns and at a ratio to the lightweight micro-proppant of about 1:10 to about 1:100; and Element 17: wherein the lightweight micro-proppant is in the proppant slurry in an amount of about 0.001 ppg to about 1 ppg. Exemplary combinations include, but are not limited to, Element 17 in combination with one of Elements 14-16.

Embodiment F is a method comprising: emulsion polymerizing styrene, ethylvinylbenzene, and divinylbenzene monomers in the presence of nanoparticles to form a lightweight micro-proppant comprising particles having a specific gravity of about 0.9 to about 1.4, having an average diameter of about 0.1 microns to about 50 microns.

Embodiments A-F may optionally also include one or more of the following (including in combination with one or more of Elements 1-17): Element 18: wherein the thermoset nanocomposite comprises nanoparticles embedded in a thermoset polymer; Element 19: Element 18 and wherein the nanoparticles are present at about 0.1% to about 60% by weight of the lightweight micro-proppant; and Element 20: Element 18 and wherein the nanoparticles comprise one selected from the group consisting of: carbon black, fumed silica, flumed alumina, carbon nanofibers, carbon nanotubes, cellulosic nanofibers, natural nanoclays, synthetic nanoclays, fly ash, metal nanoparticles, metal alloy nanoparticles, metal oxide nanoparticles, and any combination thereof.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1

FracBlack HT™ ULW proppant (styrene-ethylvinylbenzene-divinylbenzene terpolymer 14/40 mesh particles, available from Sun Drilling) were ground and sieved through a 200 mesh (74 micron) screen to produce lightweight micro-proppant. The lightweight micro-proppant and a heavy micro-proppant (ZEEOSPHERES, 2.3-2.6 specific gravity ceramic particles, available from Zeeospheres Ceramics, LLC) each suspended in water at 0.001 ppg and, then, allowed to settle. Within 15 minutes, the top third of the vial with the heavy micro-proppant sample was substantially clear indicating significant settling. In contrast, the lightweight micro-proppant maintained a cloudy dispersion. This illustrates that the lightweight micro-proppant settles more slowly, which may allow for deeper penetration into a fracture network.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   introducing a pad fluid comprising a lightweight micro-proppant into a wellbore penetrating a subterranean formation at a rate and pressure sufficient to create or extend a fracture network in the subterranean formation, wherein the fracture network comprises microfractures, and wherein the lightweight micro-proppant comprises a thermoset nanocomposite of a nanoparticle embedded in a styrene-divinylbenzene-ethylvinyl benzene thermoset polymer having about 3% to about 35% divinylbenzene by weight of its monomers, wherein the nanoparticle is selected from the group consisting of natural nanoclays, synthetic nanoclays, metal nanoparticles, metal alloy nanoparticles, metal oxide nanoparticles, and any combinations thereof, wherein the nanoparticle has an average diameter of less than about 50 nm and the lightweight micro-proppant has a specific gravity of about 0.9 to about 1.4 and an average diameter of about 0.1 microns to about 50 microns, wherein the micro-proppant is produced by an in situ polymerization method selected from the group consisting of emulsion polymerization, dispersion polymerization, or suspension polymerization; wherein the micro-proppant is mechanically treated to reduce the micro-proppant to a desired average diameter if the in situ polymerization produced particulates have a size exceeding an average diameter of about 0.1 microns to about 50 microns; wherein a porogen is used during the in situ polymerization to provide pores to the thermoset nanocomposite thereby providing the lightweight microproppant the specific gravity of about 0.9 to about 1.4;
   introducing a proppant slurry comprising a macro-proppant into the wellbore penetrating the subterranean formation after introducing the pad fluid; and
   forming a proppant pack in the fracture network wherein at least some of the lightweight micro-proppant is located in the microfractures.

2. The method of claim 1, wherein the pad fluid further comprises a heavy micro-proppant having a specific gravity of greater than about 1.5 and an average diameter of about 0.1 microns to about 80 microns.

3. The method of claim 1, wherein the pad fluid further comprises an intermediately-sized proppant at about 50 microns to about 100 microns at a ratio to the lightweight micro-proppant of about 1:10 to about 1:100.

4. The method of claim 1, wherein the proppant slurry further comprises a heavy micro-proppant having a specific gravity of greater than about 1.5 and an average diameter of about 0.1 microns to about 80 microns.

5. The method of claim 1, wherein the proppant slurry further comprises an intermediately-sized proppant having an average diameter of about 50 microns to about 100 microns.

6. The method of claim 1, wherein the lightweight micro-proppant is in the pad fluid in an amount of about 0.001 ppg to about 1 ppg.

7. The method of claim 1 further comprising:
   repeating the steps of introducing the pad fluid and introducing the proppant slurry, thereby expanding the fracture network and the proppant pack therein.

8. The method of claim 1, wherein the pad fluid is a first pad fluid and the method further comprises:
   introducing a second pad fluid into the wellbore at the rate and pressure sufficient to create or extend the fracture network in the subterranean formation.

9. The method of claim 1, wherein the microfractures have an opening that is 100 microns or less in the smallest cross-sectional dimension.

10. The method of claim 1, wherein the nanoparticles are present at about 0.1% to about 60% by weight of the lightweight micro-proppant.

11. A system for performing the method of claim 1 comprising:
   a pump fluidly connected to a wellbore penetrating a subterranean formation that introduces the pad fluid and the proppant slurry into the wellbore.

* * * * *